United States Patent [19]
Whitt et al.

[11] Patent Number: 5,684,845
[45] Date of Patent: Nov. 4, 1997

[54] MULTI-AXIS SPACER GRID KEYING FIXTURE

[75] Inventors: Jeffrey Scott Whitt; William Eastham Bailey, both of Lynchburg, Va.

[73] Assignee: Framatome Technologies, Inc., Lynchburg, Va.

[21] Appl. No.: 705,234

[22] Filed: Aug. 30, 1996

[51] Int. Cl.[6] ........................... G21C 3/334; G21C 21/00
[52] U.S. Cl. ................................................ 376/261
[58] Field of Search ..................................... 376/260, 261

[56] References Cited

U.S. PATENT DOCUMENTS

| | | | |
|---|---|---|---|
| 5,289,515 | 2/1994 | Oyama et al. | 376/261 |
| 5,303,273 | 4/1994 | Koiwai et al. | 376/261 |

Primary Examiner—Daniel D. Wasil
Attorney, Agent, or Firm—Rhodes Coats & Bennett, L.L.P.

[57] ABSTRACT

A grid keying fixture for installing grid keys in a nuclear fuel assembly spacer grid having a matrix of cells, at least some of the cells including a soft stop in a first axis and a soft stop in a second axis. The grid keying fixture includes a frame assembly having a plurality of fixture pegs affixed to the frame assembly and each arranged and adapted to enter a respective cell of the grid. Each of the fixture pegs is operable to simultaneously deflect the first axis soft stop and the second axis soft stop of the respective cell without bearing on a hard stop in the respective cell opposite one of the first axis and second axis soft stops. In the preferred embodiment, alignment pegs are affixed to the frame assembly for aligning the fixture pegs with the respective cells.

33 Claims, 6 Drawing Sheets

MULTI-AXIS SPACER GRID KEYING FIXTURE

BACKGROUND OF THE INVENTION

(1) Field of the Invention

The present invention relates generally to a method and apparatus for installing grid keys in a nuclear fuel assembly spacer grid and, more particularly, to a method and apparatus for installing grid keys in a spacer grid by simultaneously deflecting soft stops along two axes of the spacer grid.

(2) Description of the Prior Art

The concentration of fissionable material required for the operation of a nuclear reactor ordinarily is achieved through an array of fuel rods. These rods usually contain a uranium compound in pellet form.

The structural integrity of these rods, however, presents a number of very difficult technical problems. For example, the nuclear reactions that occur within a reactor generate potentially dangerous quantities of radioactive matter. Some fissionable materials, moreover, are highly toxic. Consequently, if one or more of these rods should rupture and the contained substances escape, a serious health hazard and a time-consuming and expensive decontamination and repair task will almost certainly result. The reactor environment makes the design of a sound fuel rod difficult because it imposes, for example, high temperature, coolant flow rate and pressure conditions as well as an intense radiation background. Accordingly, great care is exercised in the design, manufacture and assembly of these fuel rods.

Fuel rods usually are assembled in clusters, or "fuel elements", for installation as a part of a nuclear reactor core. Some fuel element designs engage the individual rods in a regular physical arrangement by means of spacer grids. Typically, these spacer grids are formed from a group of interlocking plates that establish a cellular structure, each cell having lodged therein a portion of a fuel rod. Spacer grids used in commercial nuclear fuel assemblies are fabricated with stops that grip the fuel rods in place when the fuel assembly is in the as-built condition. The stops on two adjacent cell walls are hard stops with a fixed location and the other two cell walls have spring loaded soft stops, typically leaf springs having integrally formed detents.

The spring mounted detents present a manufacturing difficulty. If the soft stops exert an adequate restraining force, they necessarily must abrade the fuel rod as it is inserted into and passed through a given cell making insertion of the rods more difficult, often requiring mechanical means to assist in the installation.

Accordingly, during fuel assembly fabrication it is desirable to have the soft stops withdrawn away from the centerline of each grid cell to allow free passage of the fuel rod into and through the grid. Typically, a rectangular wire grid key is inserted into and through windows in the grid. The wire key extends through the full width of the grid and is rotated so that the thickest cross section of the key wedges the strip section backward and thus withdraws the stop. The key is machined with cutouts to preclude interference with the fuel rods when in the rotated position. Examples of methods and apparatus of this or similar types are disclosed in U.S. Pat. Nos. 5,272,743 and 5,369,866 to Yamazaki et al. and U.S. Pat. Nos. 3,665,586, 3,894,327 and 3,982,994 to Jabsen.

Fixturing is required to deflect the spring stops away from the center of each cell an amount necessary to allow the passage and installation of the above described grid key. Several methods and apparatus have been developed to accomplish this task as discussed following.

Conventionally, means have been provided to deflect the soft stops in only one axis of the grid. The keys are then inserted in that axis and the deflection force from the fixture released, leaving the keys installed in one axis of the grid. The grid is then rotated 90° and the same process repeated for the second axis. The action of removing the deflection force from the first axis before installation of the keys in the second axis causes problems with the process and thus the product. Increased tilt is presented on the grid soft stop due to restriction caused by the keys inserted in the first axis, particularly the portion which interfaces with the fuel rod. Greater difficulty also is experienced in installing the grid keys in the second axis. Finally, the process often is time consuming. Each of these problems can adversely affect the quality of the spacer grid and also raise concerns as to the impact on fuel rod failures during operation of the fuel in the core. Several methods and apparatus have been developed to facilitate insertion of keying members into grids, as discussed following.

U.S. Pat. No. 3,795,040 to Jabsen discloses a method of inserting fuel rods into individual cells in a fuel element grid. A cam is introduced into the cell. The cam is rotated to deflect the grid surfaces that comprise the cell walls. A key with a dimension that generally matches the deflected grid is inserted into the cell in order to engage the temporarily bowed grid surface. The cam is rotated back to the initial orientation and withdrawn from the grid. The deflecting key sustains the deflection to enable the fuel rod to be inserted into the cell without being abraded. After fuel rod insertion, the matching dimension portion of the deflecting key is disengaged from the grid and the key is withdrawn from the cell to release the spring and allow the detent to clutch the fuel rod.

U.S. Pat. Nos. 5,068,081, 5,359,633 and 5,289,515, each to Oyama et al., disclose an assembly method and grid for nuclear fuel assembly. A deflecting jig is inserted into grid cells in each of a plurality of grids. The diameter of the deflecting jig is enlarged to urge a spring of at least one pair of dimples and spring associated with the grid cell to deflect the spring away from the dimple. A plurality of elongated key members are inserted into the grid cells through a plurality of openings defined at intersections between straps forming walls of the grid cells. Each key member is rotated about its axis to cause hooks of the key member to project from a wall surface of the strap in a direction opposite to the projecting direction of the springs. The key member is then moved in a direction to engage the hooks with the wall surface. Urging of the spring by the deflecting jig is released to allow the same to be withdrawn from the grid cells and, subsequently, the fuel rods are inserted. The key member is then moved in a direction to bring the spring into pressure contact with the fuel rods. The key members are then withdrawn from the grid cells.

U.S. Pat. No. 5,271,049 to Bell et al. discloses a grid key for interior grid cells. A rectangular main body portion is bent near the middle. Two tabs flush with the main body portion extend outward in opposite directions from an end of the main body portion. The main body portion has a thickened section that coincides with the tabs. The thickened section is wedged between the soft stops of an individual interior grid cell to retract the stops and allow loading of a fuel rod.

Each of U.S. Pat. Nos. 4,716,016 and 4,793,963 to Demario et al. disclose a universal fuel assembly construction, fuel rod cluster interchange system and method for nuclear fuel assemblies. As a part of the disclosed apparatus and method, guide fixture mounting guide rods and a pair of comb devices mounting locking bars are utilized to depress springs within the cells of the grids in order to load fuel rods into the grid cells without scratching their exterior surfaces.

U.S. Pat. No. 5,313,507 to Ohuchi et al. discloses an apparatus for attaching key member to nuclear fuel assembly grid and detaching same therefrom. The apparatus includes a supply and recovery mechanism, a serving and removing mechanism and a rotating mechanism.

U.S. Pat. No. 5,303,272 to Oyama et al. discloses an apparatus for operating the grid springs of nuclear fuel assembly.

The above-referenced U.S. Pat. No. 3,795,040 to Jabsen, the '515, the '081 and the '633 Patents to Oyama et al., and the '016 and '963 Patents to Demario have several drawbacks. For example, the cam used by Jabsen, by its nature, introduces torsional loads on the grid stops and reacts against the hard (fixed) and soft (spring) stops to operate. Oyama's deflecting jig also reacts against the hard (fixed) and soft (spring) stops in much the same way as Jabsen. Similar problems are seen in Demario.

Thus, there remains a need for a new and improved spacer grid keying fixture which provides simultaneous deflection of soft stops in both axes while, at the same time, does not require multiple deflections of the grid strips during the keying operations.

SUMMARY OF THE INVENTION

The present invention is directed to a grid keying fixture for installing grid keys in a nuclear fuel assembly spacer grid having a matrix of cells, at least some of the cells including a soft stop in a first axis and a soft stop in a second axis. The grid keying fixture includes a frame assembly having a plurality of fixture pegs affixed to the frame assembly and each arranged and adapted to enter a respective cell of the grid. Each of the fixture pegs is operable to simultaneously deflect the first axis soft stop and the second axis soft stop of the respective cell.

In the preferred embodiment, each of the fixture pegs includes a sleeve member radially expandable between an expanded position, wherein the fixture peg is operative to deflect each of the first axis soft stop and the second axis soft stop, and a retracted position wherein the fixture peg allows the first axis soft stop and the second axis soft stop to assume an undeflected position. A wedge member is transitionable between a first position and a second position.

In operation, when the wedge member is moved into the first position, the sleeve member assumes the retracted position, and, when the wedge member is moved into the second position, the sleeve member assumes the expanded position. Also in the preferred embodiment, alignment pegs are affixed to the frame assembly for aligning the fixture pegs with the respective cells.

Accordingly, one aspect of the present invention is to provide a grid keying fixture for installing grid keys in a nuclear fuel assembly spacer grid having a matrix of cells, at least some of the cells including a soft stop in a first axis and a soft stop in a second axis. The apparatus includes: (a) a frame assembly; and (b) a plurality of fixture pegs affixed to the frame assembly and each arranged and adapted to enter a respective cell of the grid, each of the fixture pegs operable to simultaneously deflect the first axis soft stop and the second axis soft stop of the respective cell.

Another aspect of the present invention is to provide a fixture peg for installing grid keys in a nuclear fuel assembly spacer grid including cells having a soft stop in a first axis and a soft stop in a second axis. The fixture peg includes: (a) a sleeve member radially expandable between an expanded position, wherein the fixture peg is operative to deflect each of the first axis soft stop and the second axis soft stop, and a retracted position wherein the fixture peg allows the first axis soft stop and the second axis soft stop to assume an undeflected position; and (b) a wedge member transitionable between a first position and a second position, wherein, when the wedge member is moved into the first position, the sleeve member assumes the retracted position, and, when the wedge member is moved into the second position, the sleeve member assumes the expanded position.

Still another aspect of the present invention is to provide a grid keying fixture for installing grid keys in a nuclear fuel assembly spacer grid having a matrix of cells, at least some of the cells including a soft stop in a first axis and a soft stop in a second axis. The apparatus includes: (a) a frame assembly; (b) a plurality of fixture pegs affixed to the frame assembly and each arranged and adapted to enter a respective cell of the grid, each of the fixture pegs operable to simultaneously deflect the first axis soft stop and the second axis soft stop of the respective cell, each of the fixture pegs including: (i) a sleeve member radially expandable between an expanded position, wherein the fixture peg is operative to deflect each of the first axis soft stop and the second axis soft stop, and a retracted position wherein the fixture peg allows the first axis soft stop and the second axis soft stop to assume an undeflected position; and (ii) a wedge member transitionable between a first position and a second position, wherein, when the wedge member is moved into the first position, the sleeve member assumes the retracted position, and, when the wedge member is moved into the second position, the sleeve member assumes the expanded position; and (c) alignment pegs affixed to the frame assembly for aligning the fixture pegs with the respective cells.

These and other aspects of the present invention will become apparent to those skilled in the art after a reading of the following description of the preferred embodiment when considered with the drawings.

DESCRIPTION OF THE PREFERRED EMBODIMENTS

Figure 1:
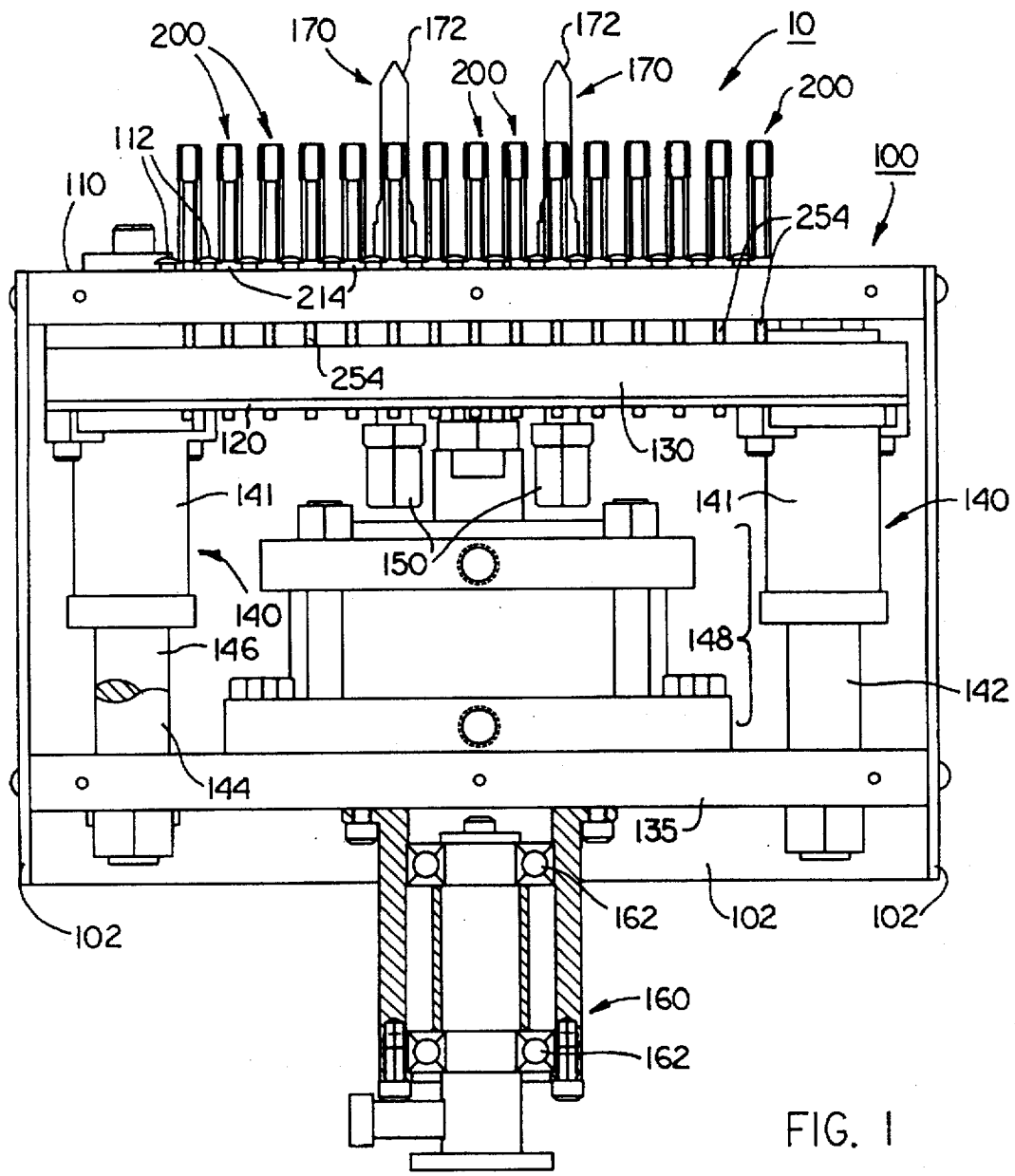
FIG. 1 is a side elevational view of a grid keying fixture constructed according to the present invention with the side shield plate removed for clarity.

In the following description, like reference characters designate like or corresponding parts throughout the several views. Also in the following description, it is to be understood that such terms as "forward", "rearward", "left", "right", "upwardly", "downwardly" and the like are words of convenience and are not to be construed as limiting terms.

Figure 2:
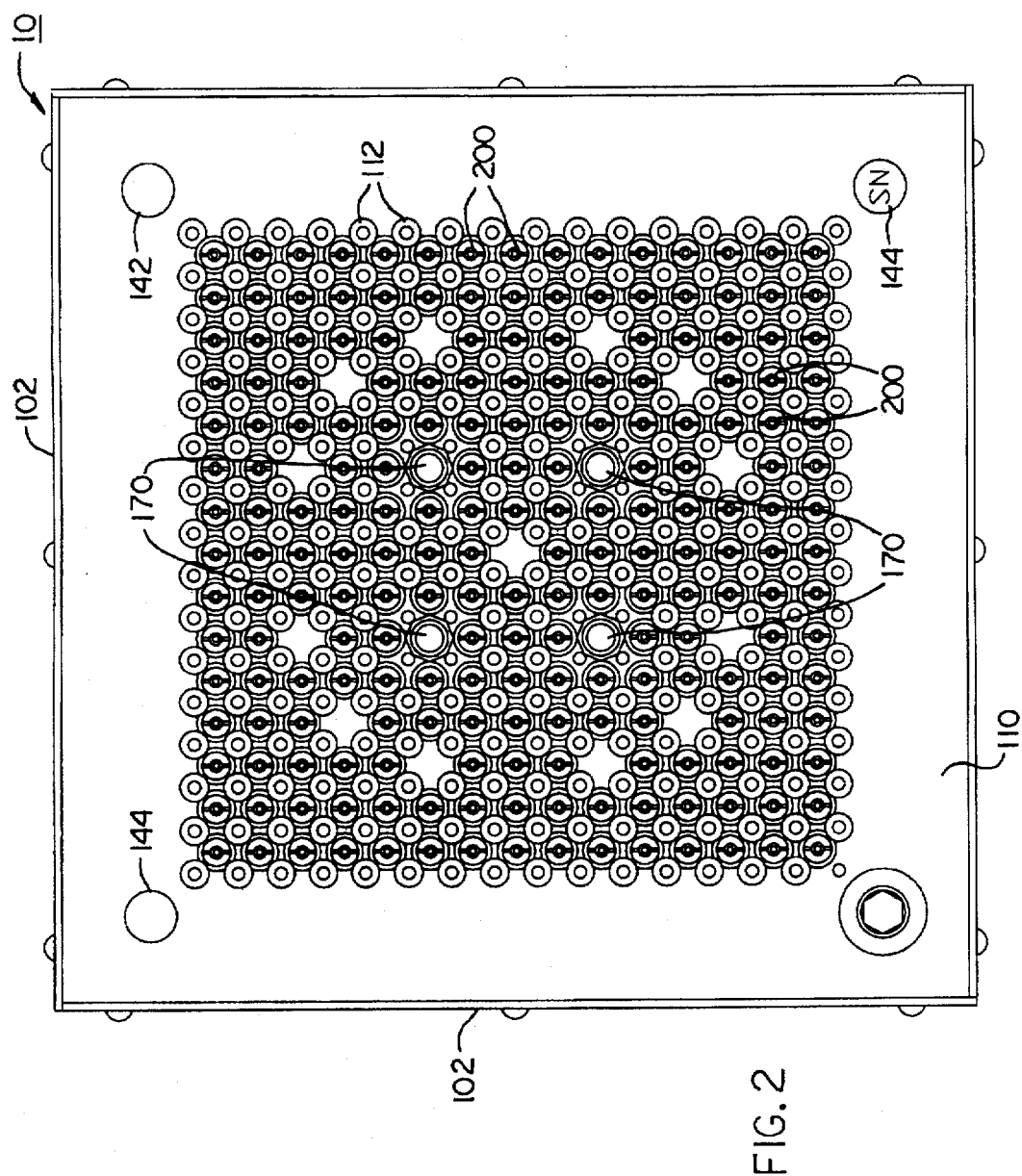
FIG. 2 is a top plan view of the grid keying fixture.

Referring now to the drawings in general and FIGS. 1 and 2 in particular, it will be understood that the illustrations are for the purpose of describing a preferred embodiment of the invention and are not intended to limit the invention thereto. As best seen in FIG. 1, a grid keying fixture, generally designated 10, is shown constructed according to the present invention.

Figure 8:
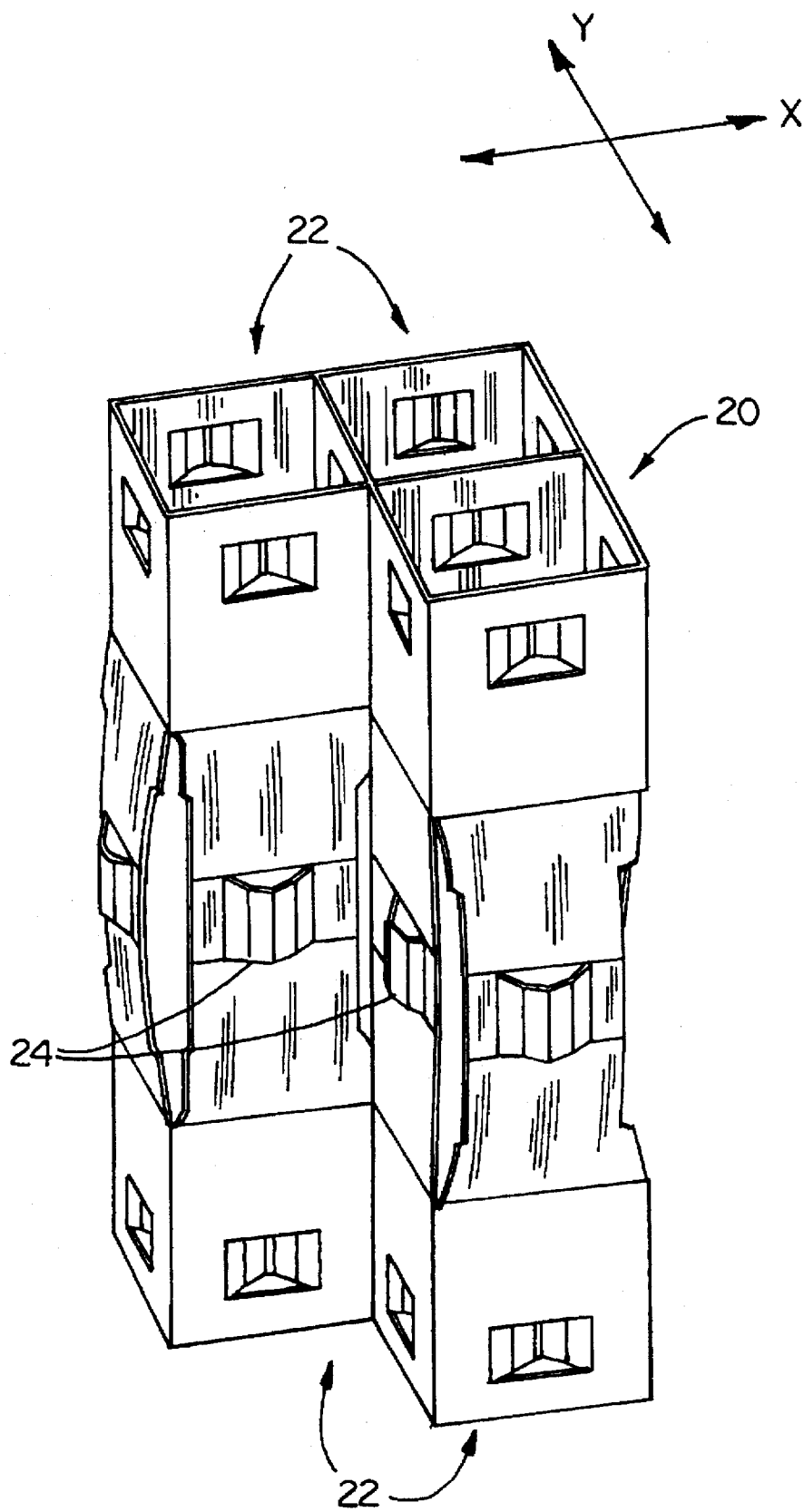
FIG. 8 is a perspective, fragmentary view of a conventional grid.

Grid keying fixture 10 includes frame assembly 100 which supports a plurality of fixture pegs 200. Grid keying fixture 10 is adapted to facilitate the loading and unloading of grid keys in a conventional grid, for example grid 20 (see FIGS. 8-10) having a matrix of cells 22 each having soft stops or springs 24 and hard stops 26. More particularly, grid keying fixture 10 serves to simultaneously deflect the soft stops 24 of grid 20 in both the X axis and the Y axis (as indicated in FIG. 8). Once the soft stops 24 have been deflected, grid keys may be introduced into and through the grid cells and installed in known manner.

Figure 3:
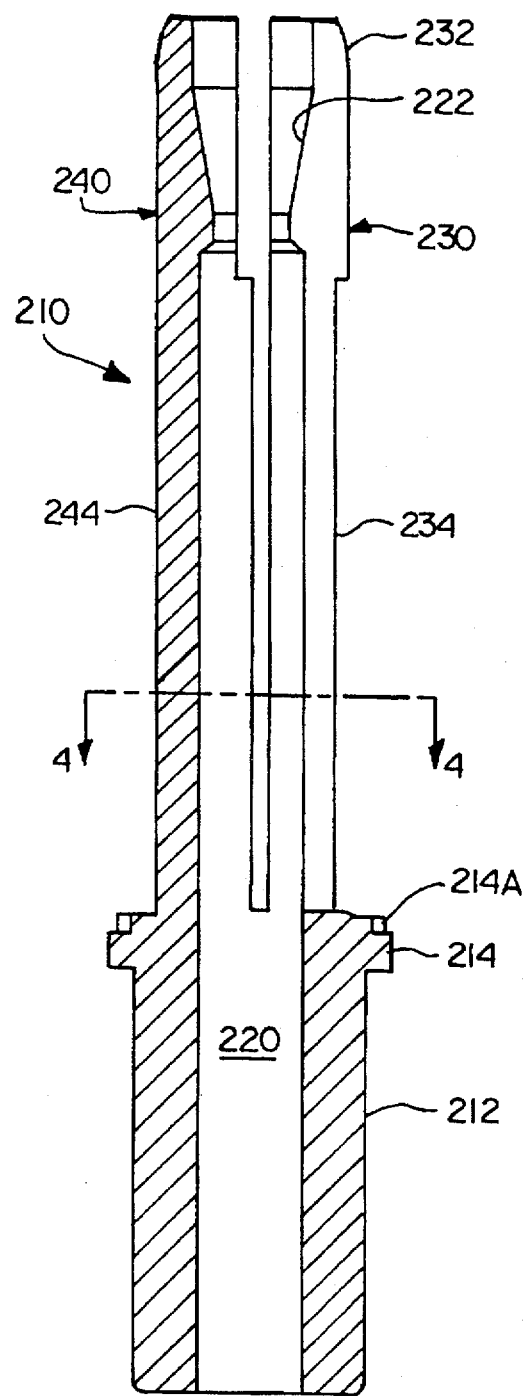
FIG. 3 is a side cross sectional view of the sleeve member forming a part of the grid keying fixture.
Figure 4:
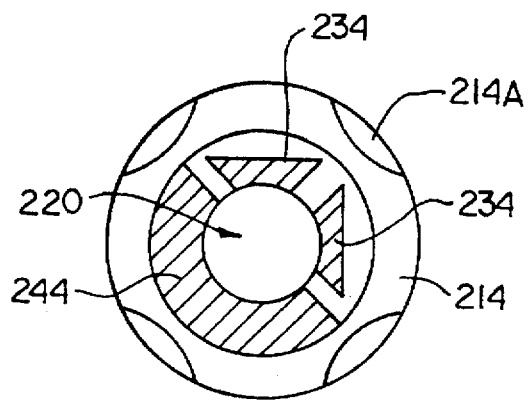
FIG. 4 is a cross sectional view of the sleeve member taken along the line 4—4.
Figure 5:
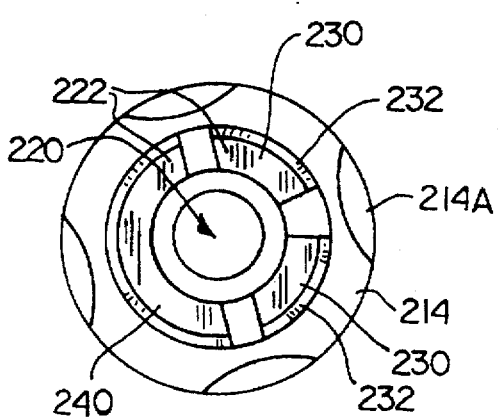
FIG. 5 is an end view of the sleeve member.

Generally and with reference to FIGS. 1 and 3-7, each fixture peg 200 includes an outer sleeve member 210 and a wedge member 250 slidably mounted therein. Each sleeve member 210 has a base 212 and an annular flange 214. Each wedge member 250 includes a shaft 254, at least a portion of which is exteriorly threaded. Fixture pegs 200 and wedge members 250 will be discussed in greater detail below. While fixture pegs 200 are shown in FIG. 2 as having sleeve members with only two slots therein, for clarity, in the preferred embodiment as shown in FIG. 5, three slots in each sleeve member define three fingers, as discussed in detail hereinbelow.

With reference to FIGS. 1-3, frame assembly 100 includes side shield plates 102. Top plate 110 is fixedly secured between the side shield plates. Counter bored holes (not shown) are formed in and all the way through top plate 110 to receive the bases 212 of fixture pegs 200. The diameter of the bores is less than the outer diameters of the annular flanges 214 of the fixture pegs 200 so that insertion of each fixture peg 200 into the respective bore is limited by its annular flange 214. Button head screws 112 are installed in complementary threaded bores (not shown) formed in plate 110 and serve to hold each sleeve member 210 in the proper position and orientation on top plate 110. As discussed in more detail below, a wedge member 250 is moved into each sleeve member 210. The shaft 254 of each wedge member 250 extends through the base 212 of the respective sleeve member 210 and through the respective bore formed in top plate 110 into which the sleeve member base is mounted. Shafts 254 further extend through threaded holes (not shown) formed in intermediate plate 130, the threads of shafts 254 engaging the threads of the bores. Further, lock plate 120, preferably formed of nylon material, includes holes (not shown) having a slightly smaller diameter than the outer diameter of the threaded shafts 254. Shafts 254 are engaged with the holes of the lock plate as well. These holes serve to provide torsional resistance to prevent rotation of wedge members 250.

Each of top plate 110, lock plate 120, intermediate plate 130 and lower base plate 135 are arranged substantially parallel to one another. Top plate 110 and lower base plate 135 are fixed in position relative to one another. Intermediate plate 130 may be moved toward and away from top plate 110 by movement along slide assemblies 140. Slide assemblies 140 include die set bushings 141, fixed bearing shaft 142, non-bearing shafts 144 and floating bearing shaft 146. Hydraulic cylinder 148 serves to selectively displace intermediate plate 130 with respect to top plate 110 along the slide assemblies 140. The degree of separation of the plates is limited by fixed stops 150.

Alignment pegs 170 are secured to top plate 110. Preferably, each alignment peg 170 has a base which is received within a complementary bore (not shown) formed in the top plate. Bolts or other suitable means may be provided to secure the alignment pegs in proper position and orientation. Each alignment peg 170 has a tapered and preferably cone shaped end 172.

Rotary/mounting assembly 160 is provided to facilitate alignment of frame assembly 100 with the grid to be loaded. Frame assembly 100 may be rotated through a range of 270° about bearings 162.

Turning to fixture pegs 200 in greater detail, an exemplary sleeve member 210 is shown in FIGS. 3-5. Sleeve member 210 includes base 212, a pair of flexible fingers 230 and a rigid finger 240. Bore 220 is defined within base 212 and between fingers 230, 240. Bore 220 includes tapered or ramped portion 222 proximate the top end opening of sleeve 210. Tapered portion 222 preferably has a slope of between about 9.5° to 10.5° with respect to vertical. Each flexible finger 230 has a curved contact surface 232, preferably having an arc angle of between about 0° to 37° and a radius of curvature of between about 0.37 inches to 0.38 inches. Each flexible finger 230 includes a respective stem portion 234. Rigid finger 240 includes stem portion 244. Notably, a substantial portion of each stem portion 234 has been removed or cut away as compared with stem 244.

As discussed above, sleeve member 210 is held in place on top plate 110 by button head screws 112. The button head screws are received in recesses 214A formed in annular flange 214. Thus, as best appreciated from FIG. 4, the relative positions of the flexible and rigid fingers with respect to frame assembly 100 may be selectively chosen to be any of four 90° offset positions.

Figure 6:
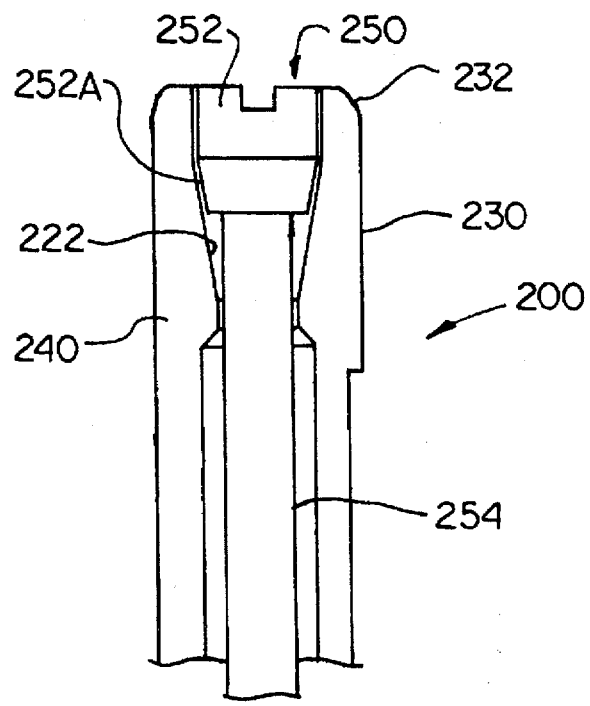
FIG. 6 is a side, cross sectional, schematic view of a fixture peg forming a part of the grid keying fixture shown in a retracted position.
Figure 7:
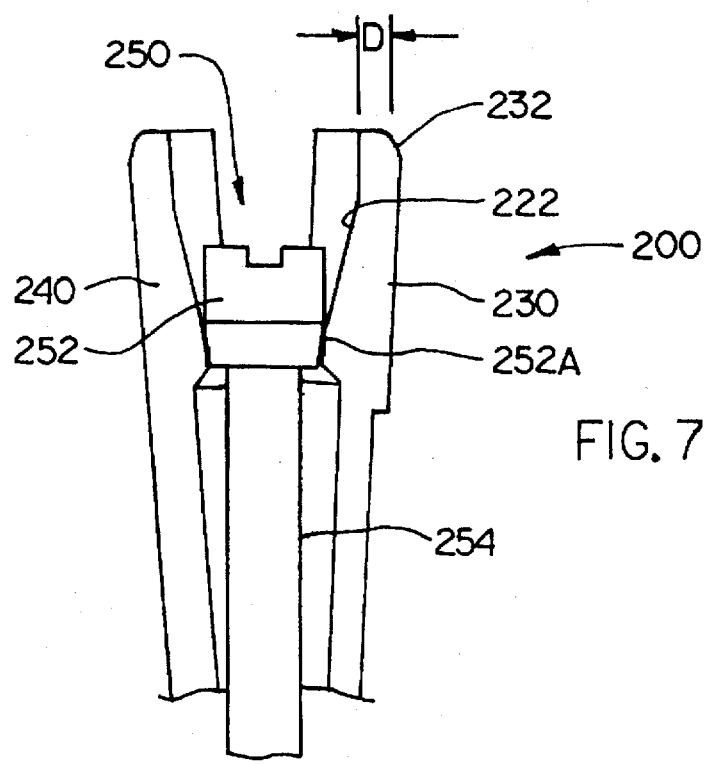
FIG. 7 is a side, cross sectional, schematic view of the fixture peg shown in an expanded position.

FIGS. 6 and 7 show a fixture peg 200 in a retracted position and in an expanded position, respectively. When fixture peg 200 is in the retracted position of FIG. 6, head 252 of wedge member 250 is positioned proximate the upper end of sleeve 200. When wedge member 250 is pulled downwardly into the expanded position as shown in FIG. 7, the tapered or ramped portion 252A of head 252 engages and bears against ramped portion 222 of the sleeve member bore. Because stem 244 of rigid finger 240 is substantially thicker than the stems 234 of flexible fingers 230 and also because of the respective geometries of the rigid and flexible fingers, rigid finger 240 maintains its original position while flexible fingers 232 are deflected outwardly, displacing contact surface 232 a distance D. The maximum withdrawal of the wedge members 250, and therefore the maximum deflection of fingers 230, may be limited by stops 150 from the intermediate plate.

From the foregoing description, it will be appreciated that the relative displacement of top plate 110 to which sleeves 210 are secured and intermediate plate 130 to which the shafts 254 of wedge members 250 are secured will result in the transition of fixture pegs 200 between the retracted position as shown in FIG. 6 and the expanded position as shown in FIG. 7.

Grid keying fixture 10 may be used to prepare a grid 20 for installation of grid keys as follows. Initially, fixture pegs 200 are moved into the retracted position. This is accomplished by moving intermediate plate 130 toward top plate 110 such that head 252 of wedge member 250 is located within bore 220 as shown in FIG. 6.

Frame assembly 110 is appropriately aligned and oriented with respect to grid 20 by rotary/mounting assembly 160. Once frame assembly 100 is properly positioned, grid 20 is installed onto the fixture. Alignment pegs 170 insure that fixture pegs 200 are properly registered with the respective cells 22 into which they are received. Once grid 20 is mounted on grid keying fixture 10, flexible fingers 230 are positioned adjacent soft stops 24 and rigid finger 240 is positioned adjacent hard stops 26, as shown schematically in FIG. 9. Because of the adjustability provided by recesses 214A and button head screws 112, the respective fingers may be properly positioned for a given cell arrangement, that is, with the flexible fingers adjacent the soft stops and the rigid finger adjacent the hard stops. Moreover, each of the several fixture pegs may be independently positioned.

Figure 10:
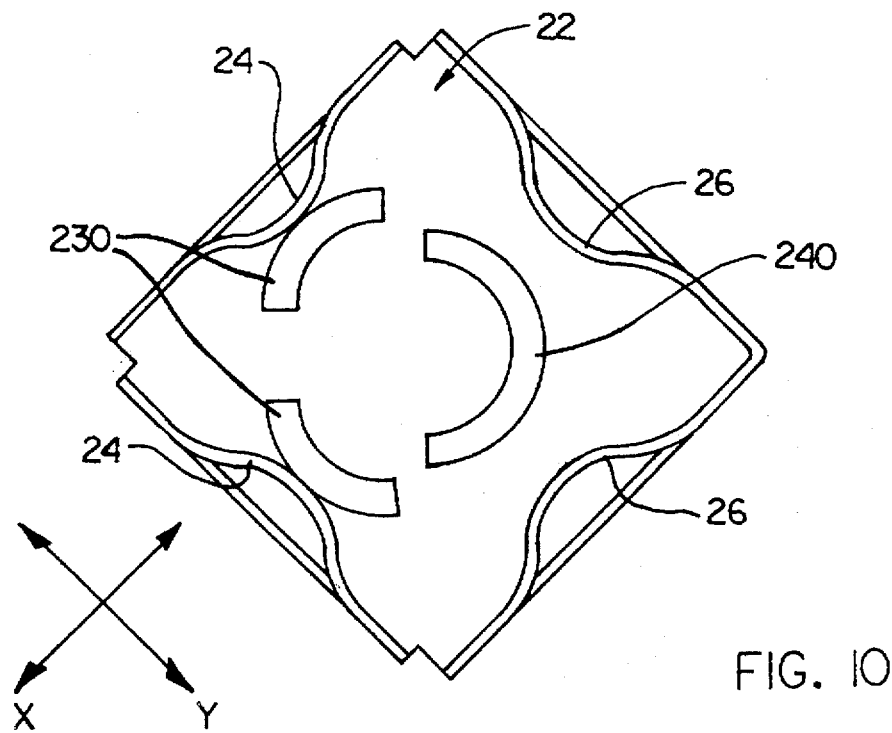
FIG. 10 is a schematic, top plan view of the fixture peg and the cell of the grid wherein the fixture peg is in the expanded position and the soft stops of the cell are in a deflected position.

Hydraulic cylinder 148 is then actuated to draw intermediate plate 130 down and away from top plate 110. As intermediate plate 130 is drawn downwardly, wedge members 250 are likewise drawn downwardly with respect to sleeve members 210 causing fixture pegs 200 to assume the expanded position as shown in FIG. 7. As a result, soft stops 24 are deflected away from the center of cell 22 by flexible fingers 230 as shown in FIG. 10. Contact surfaces 232 bear against the respective soft stops throughout the range of deflection of the soft stops. Notably, rigid finger 240 does not bear against hard stops 26. Rather, rigid finger 240 is substantially maintained in its original position relative to hard stops 26 by alignment pegs 170 and/or other suitable means for fixing the relative positions of top plate 110 and grid 20.

Figure 9:
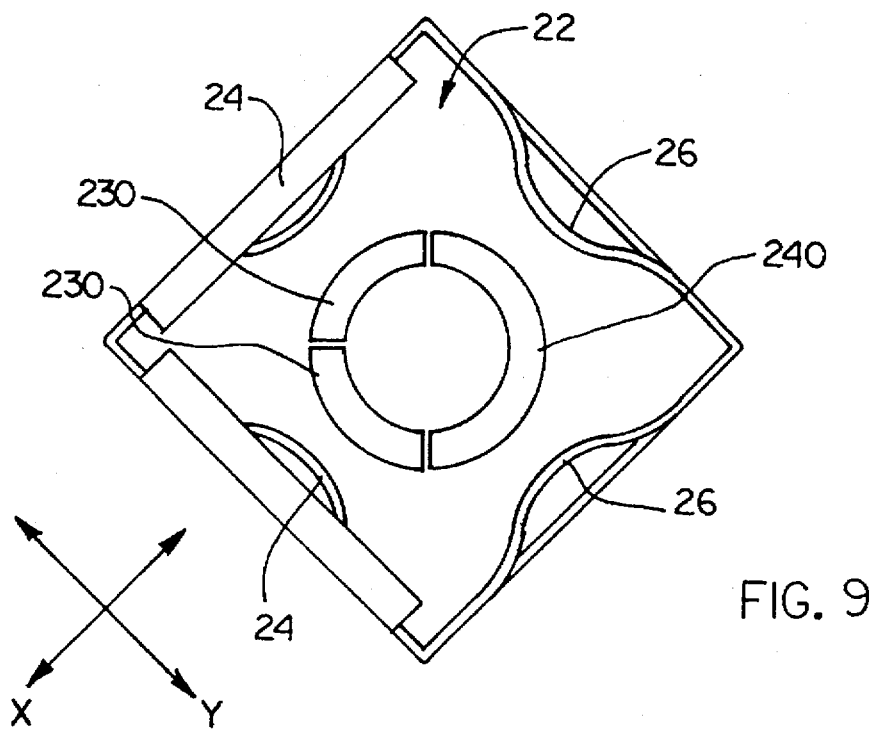
FIG. 9 is a schematic, top plan view of the fixture peg and a cell of the grid wherein the fixture peg is in the retracted position and the soft stops of the cell are in an undeflected position.

After soft stops 24 have been deflected as shown in FIG. 10, the grid keys may be installed through the windows formed in the grid in known fashion. Notably, however, grid keys may be inserted along both the X axis and the Y axis because soft stops 24 are deflected in both axes. Once the grid keys have been installed, intermediate plate 130 is again moved towards top plate 110 causing fixture pegs 200 to assume the retracted position as shown in FIGS. 6 and 9. Fixture pegs 200 may then be withdrawn from cells 22 by removing grid 20 from grid keying fixture 10.

As noted above, contact surfaces 232 of flexible fingers 230 preferably have a curved profile as shown. The curved profile provides for a constant bearing point on the respective soft stop throughout the range of deflection of the soft stop. As a result, soft stop tilt is greatly reduced or eliminated.

The grid keying fixture according to the present invention provides numerous benefits over the prior art methods and apparatus. Multiple deflections of the grid strips during keying operations are not required because the grid keying fixture provides simultaneous deflection of soft stops in both axes. Moreover, because grid keys may be installed in both axes at once, the time required for key installation is greatly reduced.

The grid keying fixture causes no more deflection than necessary to install the grid keys. In particular, the degree of expansion and positioning of the fixture pegs, and thus the amount of soft stop deflection, may be accurately and simply controlled. The degree of deflection of the soft stops is conveniently and accurately adjustable by controlling the degree of withdrawal of the wedge members. The amount of soft stop tilt is reduced or eliminated, thereby increasing the contact surface against the installed fuel rod.

The soft stops are deflected as needed without requiring contact with the hard stops which might otherwise cause damage to the hard stops and contribute to the potential for fretting the fuel rods. Further, the apparatus and method of the present invention do not present any torsional loads on the hard and soft stops, as presented by certain of the prior art methods and apparatus.

Certain modifications and improvements will occur to those skilled in the art upon a reading of the foregoing description. By way of example, the geometry of the flexible fingers may be varied to best suit different grid designs. Also, the number and size of the keying fingers may be varied for different grid designs. It should be understood that all such modifications and improvements have been deleted herein for the sake of conciseness and readability but are properly within the scope of the following claims.

We claim:

1. A grid keying fixture for installing grid keys in a nuclear fuel assembly spacer grid having a matrix of cells, at least some of the cells including a soft stop in a first axis and a soft stop in a second axis, said apparatus comprising:

(a) a frame assembly; and (b) a plurality of fixture pegs affixed to said frame assembly and each arranged and adapted to enter a respective cell of the grid, each of said fixture pegs operable to simultaneously deflect the first axis soft stop and the second axis soft stop of the respective cell without bearing on a hard stop in the respective cell opposite one of the first axis and second axis soft stops.

2. The apparatus according to claim 1 further including alignment pegs affixed to said frame assembly for aligning said fixture pegs with the respective cells.

3. The apparatus according to claim 2 wherein said alignment pegs extend beyond said fixture pegs.

4. The apparatus according to claim 3 wherein said alignment pegs are generally elongated.

5. The apparatus according to claim 4 wherein said alignment pegs have a tapered end.

6. The apparatus according to claim 5 wherein said tapered end is generally cone shaped.

7. The apparatus according to claim 1 further including rotating means for selectively positioning said frame assembly with respect to the grid and thereby aligning said fixture pegs with the respective cells.

8. The apparatus according to claim 1 wherein each of said fixture pegs includes a sleeve member and a wedge member, and wherein said frame assembly includes:

(a) a first mounting plate, said sleeve members mounted on said first mounting plate;

(b) a second mounting plate, said wedge members mounted on said second mounting plate; and (c) transition means for selectively changing the proximity of said first and second mounting plates and thereby the relative positions of said sleeve members and said wedge members.

9. The apparatus according to claim 8 wherein said transition means includes a slide assembly.

10. The apparatus according to claim 8 further including drive means operable to relatively displace said first and second mounting plates along said transition means.

11. The apparatus according to claim 10 wherein said drive means includes a hydraulic cylinder.

12. The apparatus according to claim 8 wherein said frame assembly includes a limiter stop for limiting the distance between said first and second mounting plates.

13. A fixture peg for installing grid keys in a nuclear fuel assembly spacer grid including cells having a soft stop in a first axis and a soft stop in a second axis, said fixture peg comprising:

(a) a sleeve member radially expandable between an expanded position, wherein said sleeve member includes: (i) a bore defined therein, a wedge member slidably positioned within said bore; (ii) first and second flexible fingers; (iii) at least one substantially rigid finger; and (iv) wherein, when said sleeve member is in said expanded position, said first and second flexible fingers are deflected outwardly thereby contacting and deflecting the first axis and second axis soft stops, respectively, and said rigid finger is not substantially deflected, wherein said fixture peg is operative to deflect each of the first axis soft stop and the second axis soft stop, and a retracted position wherein said fixture peg allows the first axis soft stop and the second axis soft stop to assume an undeflected position; and (b) said wedge member transitionable between a first position and a second position; wherein, when said wedge member is moved into said first position, said sleeve member assumes said retracted position, and, when said wedge member is moved into said second position, said sleeve member assumes said expanded position.

14. The apparatus according to claim 14 wherein each of said first and second flexible fingers includes an outer surface which contacts the respective one of the first axis soft stop and the second axis soft stop, said outer surface having a curved profile.

15. The apparatus according to claim 14 wherein said wedge member and said bore are relatively configured such that said sleeve member may be transitioned between said retracted and expanded positions by relative axial movement of said wedge member and said bore.

16. The apparatus according to claim 14 wherein said bore is tapered proximate said first and second flexible fingers and said wedge member is also tapered.

17. A grid keying fixture for installing grid keys in a nuclear fuel assembly spacer grid having a matrix of cells, at least some of the cells including a soft stop in a first axis and a soft stop in a second axis, said apparatus comprising:

(a) a frame assembly;

(b) a plurality of fixture pegs affixed to said frame assembly and each arranged and adapted to enter a respective cell of the grid, each of said fixture pegs operable to simultaneously deflect the first axis soft stop and the second axis soft stop of the respective cell without bearing on a hard stop in the respective cell opposite one of the first axis and second axis soft stops, each of said fixture pegs including: (i) a sleeve member radially expandable between an expanded position, wherein said fixture peg is operative to deflect each of the first axis soft stop and the second axis soft stop, and a retracted position wherein said fixture peg allows the first axis soft stop and the second axis soft stop to assume an undeflected position; and (ii) a wedge member transitionable between a first position and a second position; wherein, when said wedge member is moved into said first position, said sleeve member assumes said retracted position, and, when said wedge member is moved into said second position, said sleeve member assumes said expanded position; and (c) alignment pegs affixed to said frame assembly for aligning said fixture pegs with the respective cells.

18. The apparatus according to claim 17 wherein said alignment pegs extend beyond said fixture pegs.

19. The apparatus according to claim 18 wherein said alignment pegs are generally elongated.

20. The apparatus according to claim 19 wherein said alignment pegs have a tapered end.

21. The apparatus according to claim 20 wherein said tapered end is generally cone shaped.

22. The apparatus according to claim 17 further including rotating means for selectively positioning said frame assembly with respect to the grid and thereby aligning said fixture pegs with the respective cells.

23. The apparatus according to claim 17 wherein each of said fixture pegs includes a sleeve member and a wedge member, and wherein said frame assembly includes:

(a) a first mounting plate, said sleeve members mounted on said first mounting plate;

(b) a second mounting plate, said wedge members mounted on said second mounting plate; and (c) transition means for selectively changing the proximity of said first and second mounting plates and thereby the relative positions of said sleeve members and said wedge members.

24. The apparatus according to claim 23 wherein said transition means includes a slide assembly.

25. The apparatus according to claim 23 further including drive means operable to relatively displace said first and second mounting plates along said transition means.

26. The apparatus according to claim 25 wherein said drive means includes a hydraulic cylinder.

27. The apparatus according to claim 23 wherein said frame assembly includes a limiter stop for limiting the distance between said first and second mounting plates.

28. A grid keying fixture for installing grid keys in a nuclear fuel assembly spacer grid having a matrix of cells, at least some of the cells including a soft stop in a first axis and a soft stop in a second axis, said apparatus comprising:

(a) a frame assembly;

(b) a plurality of fixture pegs affixed to said frame assembly and each arranged and adapted to enter a respective cell of the grid, each of said fixture pegs operable to simultaneously deflect the first axis soft stop and the second axis soft stop of the respective cell, each of said fixture pegs including: (i) a sleeve member radially expandable between an expanded position, wherein said fixture peg is operative to deflect each of the first axis soft stop and the second axis soft stop, and a retracted position wherein said fixture peg allows the first axis soft stop and the second axis soft stop to assume an undeflected position; and (ii) a wedge member transitionable between a first position and a second position; wherein, when said wedge member is moved into said first position, said sleeve member assumes said retracted position, and, when said wedge member is moved into said second position, said sleeve member assumes said expanded position; and (c) alignment pegs affixed to said frame assembly for aligning said fixture pegs with the respective cells; wherein said sleeve member includes: a bore defined therein, said wedge member slidably positioned within said bore; first and second flexible fingers; at least one substantially rigid finger; and wherein, when said sleeve member is in said expanded position, said first and second flexible fingers are deflected outwardly thereby contacting and deflecting the first axis and second axis soft stops, respectively, and said rigid finger is not substantially deflected.

29. The apparatus according to claim 28 wherein each of said first and second flexible fingers includes an outer surface which contacts the respective one of the first axis soft stop and the second axis soft stop, said outer surface having a curved profile.

30. The apparatus according to claim 28 wherein said wedge member and said bore are relatively configured such that said sleeve member may be transitioned between said retracted and expanded positions by relative axial movement of said wedge member and said bore.

31. The apparatus according to claim 28 wherein said bore is tapered proximate said first and second flexible fingers and said wedge member is also tapered.

32. A method for installing grid keys in a nuclear fuel assembly spacer grid having a matrix of cells, at least some of the cells including a soft step in a first axis and a soft stop in a second axis, said method comprising the step of: simultaneously deflecting the first axis soft stop and the second axis soft stop of the respective cell without bearing on a hard stop in the respective cell opposite one of the first axis and second axis soft stops using a plurality of fixture pegs affixed to a frame assembly and each arranged and adapted to enter a respective cell of the grid.

33. A method for installing grid keys in a nuclear fuel assembly spacer grid having a matrix of cells, at least some of the cells including a soft stop in a first axis and a soft stop in a second axis, said method comprising step of: simultaneously deflecting the first axis soft stop and the second axis soft stop of the respective cell without bearing on a hard stop in the respective cell opposite one of the first axis and second axis soft stops using a plurality of fixture pegs affixed to a frame assembly and each arranged and adapted to enter a respective cell of the grid, each of said fixture pegs including: (i) a sleeve member radially expandable between an expanded position, wherein said fixture peg is operative to deflect each of the first axis soft stop and the second axis soft stop, and a retracted position wherein said fixture peg allows the first axis soft stop and the second axis soft stop to assume an undeflected position; and (ii) a wedge member transitionable between a first position and a second position; wherein, when said wedge member is moved into said first position, said sleeve member assumes said retracted position, and, when said wedge member is moved into said second position, said sleeve member assumes said expanded position.

* * * * *